United States Patent
Krishna et al.

(10) Patent No.: US 12,013,753 B2
(45) Date of Patent: Jun. 18, 2024

(54) PROACTIVE LOSS NOTIFICATION AND HANDLING IN DATA STORAGE DEVICES

(71) Applicant: Western Digital Technologies, Inc., San Jose, CA (US)

(72) Inventors: Bhavya Krishna, Ernakulam (IN); Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/752,771

(22) Filed: May 24, 2022

(65) Prior Publication Data
US 2023/0385148 A1    Nov. 30, 2023

(51) Int. Cl.
G06F 11/00 (2006.01)
G06F 11/07 (2006.01)
G06F 11/10 (2006.01)

(52) U.S. Cl.
CPC ........ *G06F 11/106* (2013.01); *G06F 11/0727* (2013.01); *G06F 11/1004* (2013.01); *G06F 11/1076* (2013.01)

(58) Field of Classification Search
CPC ............... G06F 11/106; G06F 11/0727; G06F 11/1076; G06F 11/1004; G06F 11/3034
See application file for complete search history.

(56) References Cited

U.S. PATENT DOCUMENTS

| 8,478,796 | B2 | 7/2013 | Post et al. | |
| 11,175,984 | B1* | 11/2021 | Lercari | G06F 11/0784 |
| 2016/0034353 | A1* | 2/2016 | Tuers | H03M 13/152 |
| | | | | 714/764 |
| 2017/0160960 | A1* | 6/2017 | Camp | G06F 11/108 |
| 2020/0409808 | A1* | 12/2020 | Seetharaman | G06F 11/106 |
| 2022/0137859 | A1* | 5/2022 | Ahn | G06F 11/106 |
| | | | | 711/154 |
| 2022/0254434 | A1* | 8/2022 | Yeung | G11C 29/88 |
| 2022/0358016 | A1* | 11/2022 | Park | G06F 11/1415 |

OTHER PUBLICATIONS

NVM Express, "NVM Command Set Specification," Revision 1.0a, dated Jul. 23, 2021 (105 pages).

* cited by examiner

*Primary Examiner* — Joseph D Manoskey
(74) *Attorney, Agent, or Firm* — Michael Best & Friedrich LLP

(57) ABSTRACT

Devices, systems, and methods with proactive data loss notification and handling. A data storage device includes a memory and a controller. The controller includes a processor and controller memory. The controller memory stores a set of instructions that, when executed by the processor, instruct the controller to: detect an uncorrectable error correction code (UECC) during an internal data movement process of the storage device memory, modify a metadata field associated with a logical block address corresponding to the UECC, inform a host device about the UECC, and determine whether data stored in at least one adjacent region to the logical block address is lost.

20 Claims, 5 Drawing Sheets

PROACTIVE LOSS NOTIFICATION AND HANDLING IN DATA STORAGE DEVICES

FIELD OF DISCLOSURE

Embodiments described herein relate to data storage devices, and in particular, devices, systems, and methods with proactive data loss notification and handling.

BACKGROUND

In conventional data storage systems where a data storage device communicates with a host device, when an uncorrectable error correction code (UECC) is detected during a host read, the data storage device informs the host device of the UECC. The host device may trigger a redundant array of independent disks (RAID) mechanism to recover the lost data or stub the data loss in its application to handle the scenario. RAID is a mechanism by which a data storage system stores data in multiple drives of the system. RAID enables improved performance through data stripping and recovery for corrupted data due to its redundant structure.

Within the data storage device, data is moved around by certain routines that operate in the background, such as garbage collection (GC), wear levelling (WL) and read scrub (RS) processes. During these processes it is possible that the source data is not retrievable due to a flash UECC. Typically, a lost flash memory unit (FMU) is marked with flash UECC metadata, so that when the host requests this data at a later point in time, the UECC is returned by the storage device. This can potentially impact the performance of the system. Furthermore, RAID systems may take up to several days to recover lost data, as the recovery process is only initiated by the host when it becomes aware of the data loss after a host read failed.

SUMMARY

Performance of the data storage system may be improved by proactively intimating or informing the host when a UECC is detected, even during internal data movement when there is no specific host request. Both in RAID and non-RAID systems, preemptively intimating or informing the host of a data loss will help the host issue intelligent reads based on the information, or execute logic to stub the lost data. For example, in some data storage systems, lost data may only be recoverable for a certain amount of time after it has been lost. Additionally, some data storage systems may not discover that data has been lost until that data is requested by a host device or needed for another operation. Therefore, performance of a data storage system may be improved by preemptively identifying data loss and notifying the host device of the data loss or handling recovery of the lost data. In particular, by identifying and recovering lost data before it is needed, the host device will not need to wait for the data to be recovered when it requests the data.

When a UECC is detected in a logical block address (LBA) as part of internal data movement or if the host requested a "get LBA" status, the storage device sanitizes the neighboring physical region and relocates and/or indicates to the host necessarily using the reverse flash translation layer (FTL). System performance may be improved by implementing a data storage device such that, when the data storage device detects a UECC during GC, WL, or RS, it proactively indicates the loss of data to the host (even if the LBA is outside the host specified LBA asynchronous alert range) in addition to the existent metadata modification, even though the request for that logical data was not received initially. Furthermore, when the data storage device detects data loss by means of a UECC during host reads, the data storage device may scan the neighboring physical regions. Using a reverse flash translation table stored within a memory of the data storage device, the LBAs can be found for the neighboring physical addresses. The data storage device may then look for data corruption in these neighboring valid regions and attempt to recover the data. If the recovery in the neighboring region fails, the data storage device proactively informs the host about the neighborhood loss as well.

Within the host, proactive indication of the loss of data allows the host enough time to rebuild the data using its RAID and re-write the data back to the storage device. In cases where the RAID is not available, the host can either not issue reads to these lost LBAs or attempt to reconstruct the lost data through other means.

As an example, on determining a fragment loss, the data storage device may proactively indicate the host of the loss. Upon determining that the logical data is a portion of a video frame, the host may trigger steps to rebuild data through neighboring frames, which subsequently may involve read and write of other logical data from storage device. The end-to-end device solution involves proactively notifying loss of logical data and sanitizing the neighborhood, in addition to the host triggering proactive RAID or frame stub mechanism to compensate or stub the loss.

Therefore, to improve performance of data storage devices, data storage systems may implement proactive loss notification and handling. Embodiments described herein provide systems and methods for implementing proactive loss notification and handling in data storage systems.

In particular, embodiments described herein provide a data storage device comprising a memory and a controller. The controller includes an electronic processor and a controller memory, the controller memory storing a set of instructions. The set of instructions, when executed by the electronic processor, instruct the controller to detect an uncorrectable error correction code during an internal data movement process of the memory; modify a metadata field associated with a logical block address corresponding to the uncorrectable error correction code; inform an external electronic device about the uncorrectable error correction code; and determine whether data stored in at least one adjacent region to the logical block address is lost.

Other embodiments described herein provide a method of handling data loss. The method includes the steps of detecting, with an electronic processor, an uncorrectable error correction code (UECC) during an internal data movement process of a data storage device; modifying, with the electronic processor, a metadata field associated with a logical block address corresponding to the UECC; informing an external electronic device about the UECC; and determining whether data stored in at least one adjacent region to the logical block address is lost.

Further embodiments described herein provide a data storage system comprising a data storage device and an external electronic device (e.g., a host device). The data storage device includes a memory controller and a memory, and the memory controller includes an electronic processor and a controller memory. The external electronic device includes an external electronic device processor and an external electronic device memory. The controller memory stores a set of instructions that, when executed by the data storage device electronic processor, instruct the data storage device to detect an uncorrectable error correction code (UECC) during an internal data movement process of the data storage device; modify a metadata field associated with a logical block address corresponding to the UECC; generate a notification to be sent to the external electronic device about the UECC; and determine whether data stored in at least one adjacent region to the logical block address is lost.

DETAILED DESCRIPTION

Figure 1:
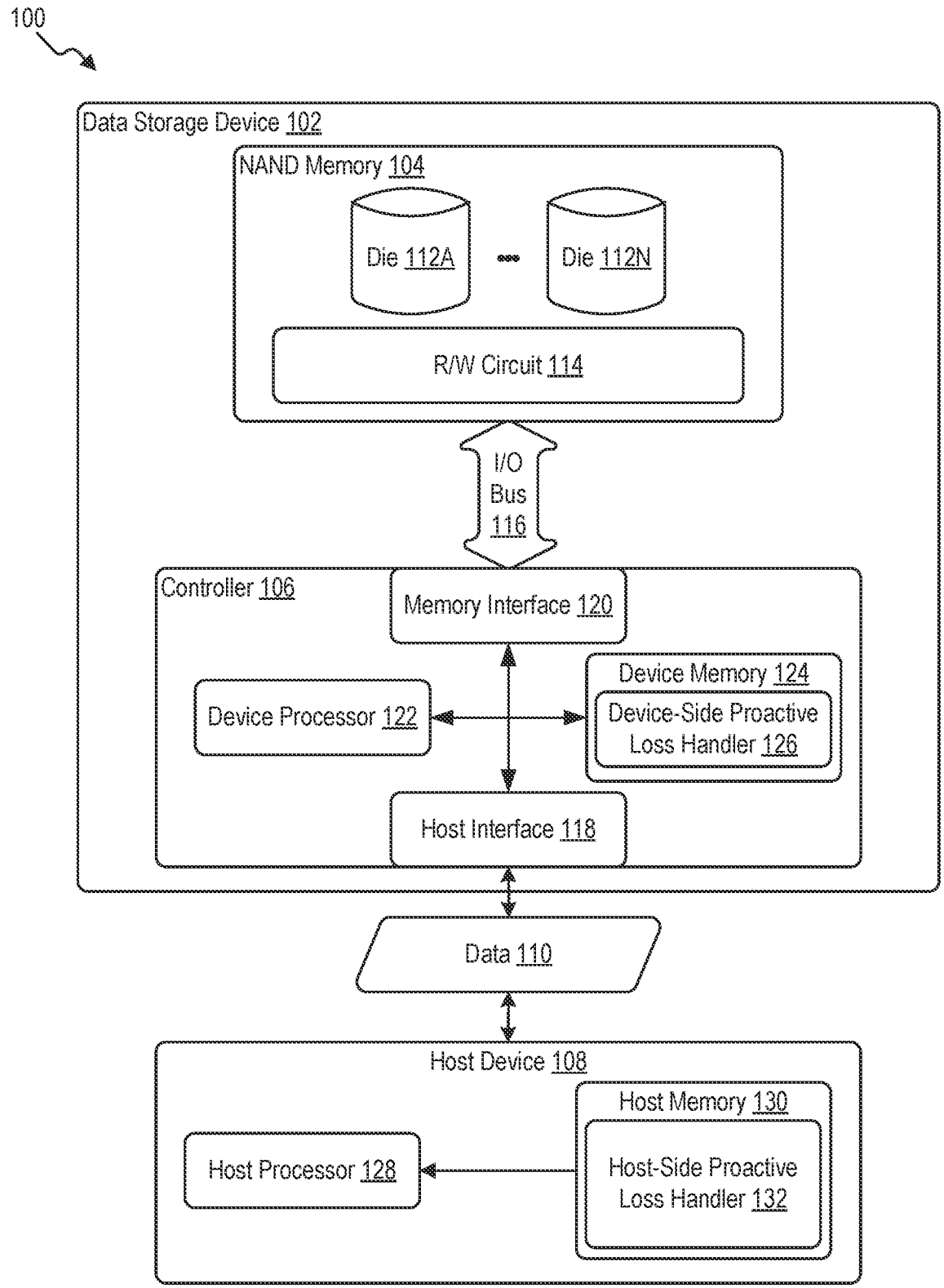
FIG. 1 is a block diagram illustrating a system including a data storage device and a host device, according to some aspects of the present disclosure.

One or more embodiments and various aspects are described and illustrated in the following description and accompanying drawings. These embodiments, examples, and aspects are not limited to the specific details provided herein and may be modified or combined in various ways. Furthermore, other embodiments, examples, and aspects may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 is block diagram of one example of a system 100 that includes a data storage device 102. In some implementations, the data storage device 102 is a flash memory device. For example, the data storage device 102 is a Secure Digital SD® card, a microSD® card, or another similar type of data storage device. The data storage device 102 illustrated in FIG. 1 includes a NAND memory 104 and a controller 106. The data storage device 102 is coupled to a host device 108 (also referred to herein as an "external electronic device"). The host device 108 is configured to provide data 110 (for example, user data) to the data storage device 102 to be stored, for example, in the NAND memory 104. The host device 108 is also configured to request data 110 to be read from the NAND memory 104. The host device 108 is, for example, a smart phone, a music player, a video player, a gaming console, an e-book reader, a personal digital assistance, a tablet, a notebook computer, or another similar device.

The NAND memory 104 illustrated in FIG. 1 includes a plurality of dies 112A-112N (for example, NAND dies) and a read/write circuit 114. The read/write circuit 114 is configured to support operation of the plurality of dies 112A-112N of the NAND memory 104. Although depicted as a single component in FIG. 1, the read/write circuit 114 may be divided into separate components of the NAND memory 104, such as a read circuit and a write circuit. The read/write circuit 114 may be external to the plurality of dies 112A-112N of the NAND memory 104. Alternatively, one or more of the plurality of dies 112A-112N of the NAND memory 104 may include corresponding read/write circuitry that is operable to read data from and/or write data to storage elements within the individual die independent of any other read and/or write operations at any of the other dies. For example, each of the plurality of dies 112A-112N may include its own internal read/write circuitry. The NAND memory 104 is communicable coupled to the controller 106 by an input/output ("I/O") bus 116.

The controller 106 illustrated in FIG. 1 includes a host interface 118, a memory interface 120, a device processor 122 (for example, a microprocessor, a microcontroller, a field-programmable gate array (FPGA) semiconductor, an application specific integrated circuit (ASIC), or another suitable programmable device), and a device memory 124 (for example, a random-access memory (RAM), a read-only memory (ROM), a non-transitory computer readable medium, or a combination thereof). The controller 106 is illustrated in FIG. 1 in a simplified form. One skilled in the art would recognize that a controller for a NAND memory may include additional modules or components other than those specifically illustrated in FIG. 1. Additionally, although the data storage device 102 is illustrated in FIG. 1 as including the controller 106, in other implementations, the controller 106 is instead located within the host device 108 or is otherwise separate from the data storage device 102. As a result, operations that would normally be performed by the controller 106 (for example, wear leveling, bad block management, data scrambling, garbage collection, address mapping, or other suitable operations) can be performed by the host device 108 or another device that connects to the data storage device 102.

The controller 106 is configured to send data to, and receive data and instructions from, the host device 108 by means of the host interface 118. The host interface 118 enables the host device 108 to, for example, read from the NAND memory 104 and to write to the NAND memory 104 using any suitable communication protocol. Suitable communication protocols include, for example, the Universal Flash Storage (UFS) Host Controller Interface specification, the Secure Digital (SD) Host Controller specification, or other suitable communication protocols.

The controller 106 is also configured to send data and commands to, and receive data from, the NAND memory 104 by means of the memory interface 120. As an illustrative example, the controller 106 is configured to send data and a program command to instruct the NAND memory 104 to store data in a particular memory location in the NAND memory 104. The controller 106 is also configured to send a read-transfer command to the NAND memory 104 to read data from a particular memory location in the NAND memory 104.

The device processor 122 is operatively connected to the various modules within the controller 106 and the data storage device 102. For example, firmware is loaded in a ROM of the device memory 124 as computer executable instructions. Those computer executable instructions are capable of being retrieved from the device memory 124 and executed by the device processor 122 to control the operation of the controller 106 and perform the processes described herein. For example, the device memory 124 may include a device-side proactive loss handler 126. The device-side proactive loss handler 126 is a set of instructions that, when executed by the device processor 122, perform a set of operations for loss notification and handling (described with respect to FIGS. 2 and 4). In some implementations, one or more modules of the controller 106 correspond to separate hardware components within the controller 106. In other implementations, one or more modules of the controller 106 correspond to software stored within the device memory 124 and executed by the device processor 122. The device memory 124 is configured to store data used by the controller 106 during operation.

The host device 108 illustrated in FIG. 1 includes a host processor 128 (for example, a microprocessor, a microcontroller, an FPGA semiconductor, an ASIC, or another suitable programmable device), and a host memory 130 (for example, a RAM, a ROM, a non-transitory computer readable medium, or a combination thereof). The host device 108 is illustrated in FIG. 1 in a simplified form. One skilled in the art would recognize that the host device 108 may include additional modules or components other than those specifically illustrated in FIG. 1.

The host processor 128 is operatively connected to the various modules within the host device 108. For example, firmware is loaded in a ROM of the host memory 130 as computer executable instructions. Those computer executable instructions are capable of being retrieved from the host memory 130 and executed by the host processor 128 to control the operation of the host device 108 and perform the processes described herein. For example, the host memory 130 may include a host-side proactive loss handler 132. The host-side proactive loss handler 132 is a set of instructions that, when executed by the host processor 128, perform a set of operations for loss notification and handling (described with respect to FIGS. 3 and 5). The host memory 130 is configured to store data used by the host device 108 during operation.

Figure 2:
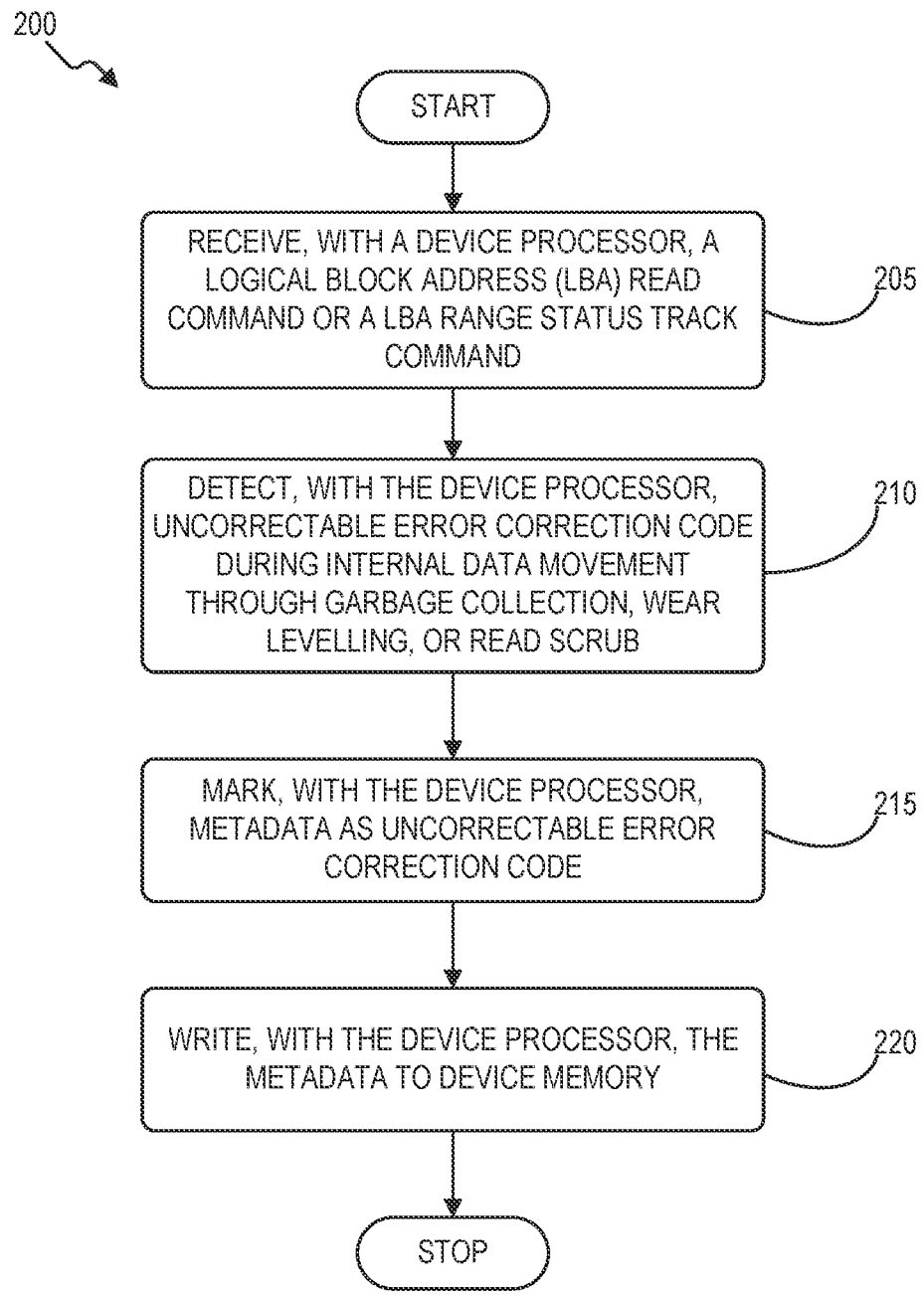
FIG. 2 is a flowchart illustrating a comparative method of handling data loss with a data storage device.

As stated above, the device memory 124 may store a set of instructions that, when executed by the device processor 122, perform a set of operations for loss notification and handling. FIG. 2 is a flowchart illustrating a comparative method 200 of handling data loss with a data storage device (such as the data storage device 102 of FIG. 1).

The method 200 includes receiving, with a device processor, a LBA read command or an LBA range status track command (at block 205). The LBA read command or the LBA range status track command may be received from an external electronic device. For example, the device processor 122 receives an LBA read command or an LBA range status track command from the host device 108.

The method 200 includes detecting, with a device processor, an uncorrectable error correction code (UECC) during internal data movement through a garbage collection (GC), wear levelling (WL), or read scrub (RS) process (at block 210). The detection of the UECC during the GC, WL, or RS process is sometimes referred to as "data loss." For example, the device processor 122 detects a UECC during internal movement through a GC, WL, or RS process.

The method 200 includes marking, with the device processor, metadata corresponding to the lost data as having a UECC (at block 215). The lost data may correspond to a flash memory unit (FMU), and the metadata may be a flash UECC metadata field. For example, the device processor 122 marks metadata as having a UECC.

The method 200 also includes writing, with the device processor, the metadata to device memory (at block 220). For example, the device processor 122 writes the metadata to the device memory 124.

Figure 3:
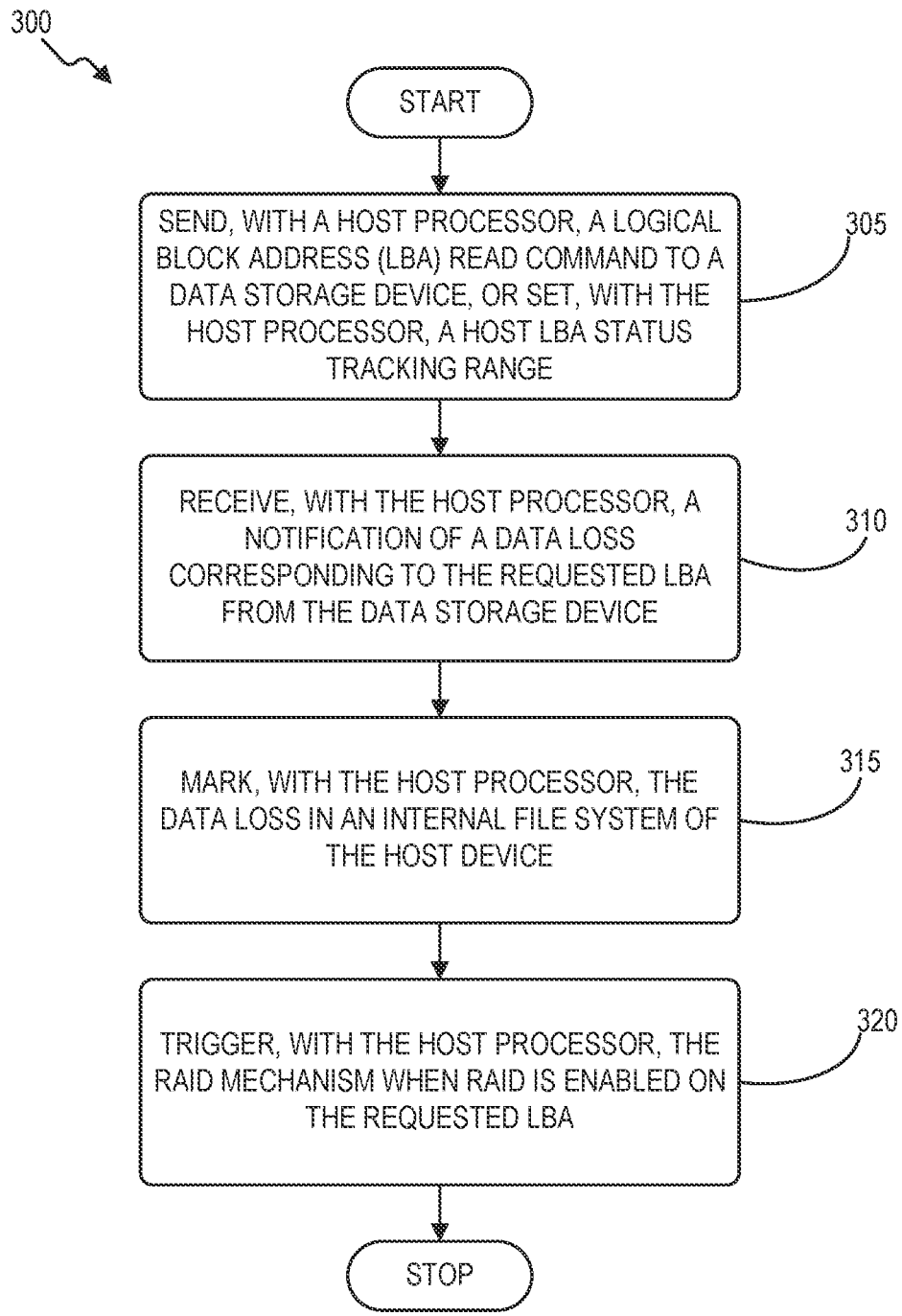
FIG. 3 is a flowchart illustrating a comparative method of handling data loss with a host device.

As stated above, the host memory 130 may store a set of instructions that, when executed by the host processor 128, perform a set of operations for loss notification and handling. FIG. 3 is a flowchart illustrating a comparative method 300 of handling data loss with a host device (such as the host device 108 of FIG. 1).

The method 300 includes sending, with a host processor, a LBA read command to a data storage device or setting, with the host processor, a host LBA status tracking range in addition to or instead of sending the LBA read command (at block 305). For example, in a first instance the host processor 128 sends an LBA read command to the data storage device 102. In a second instance the host processor 128 sets a host LBA status tracking range. In a third instance the host processor 128 both sends an LBA read command to the data storage device 102 and sets a host LBA status tracking range.

The method 300 includes receiving, with the host processor, a data loss notification corresponding to the requested LBA from the data storage device (at block 310). The lost data may correspond to a flash memory unit (FMU). For example, the host processor 128 receives a notification of a data loss corresponding to the requested LBA from the data storage device 102.

The method 300 includes marking, with the host processor, the data loss in an internal file system of the host device (at block 315). For example, the host processor 128 marks the data loss in an internal file system of the host device 108 (such as a file system within the host memory 130).

The method 300 also includes triggering, with the host processor, a redundant array of independent disks (RAID)

mechanism when RAID is enabled on the requested LBA (at block 320). For example, the host processor 128 triggers a RAID mechanism when RAID is enabled on the requested LBA.

Figure 4:
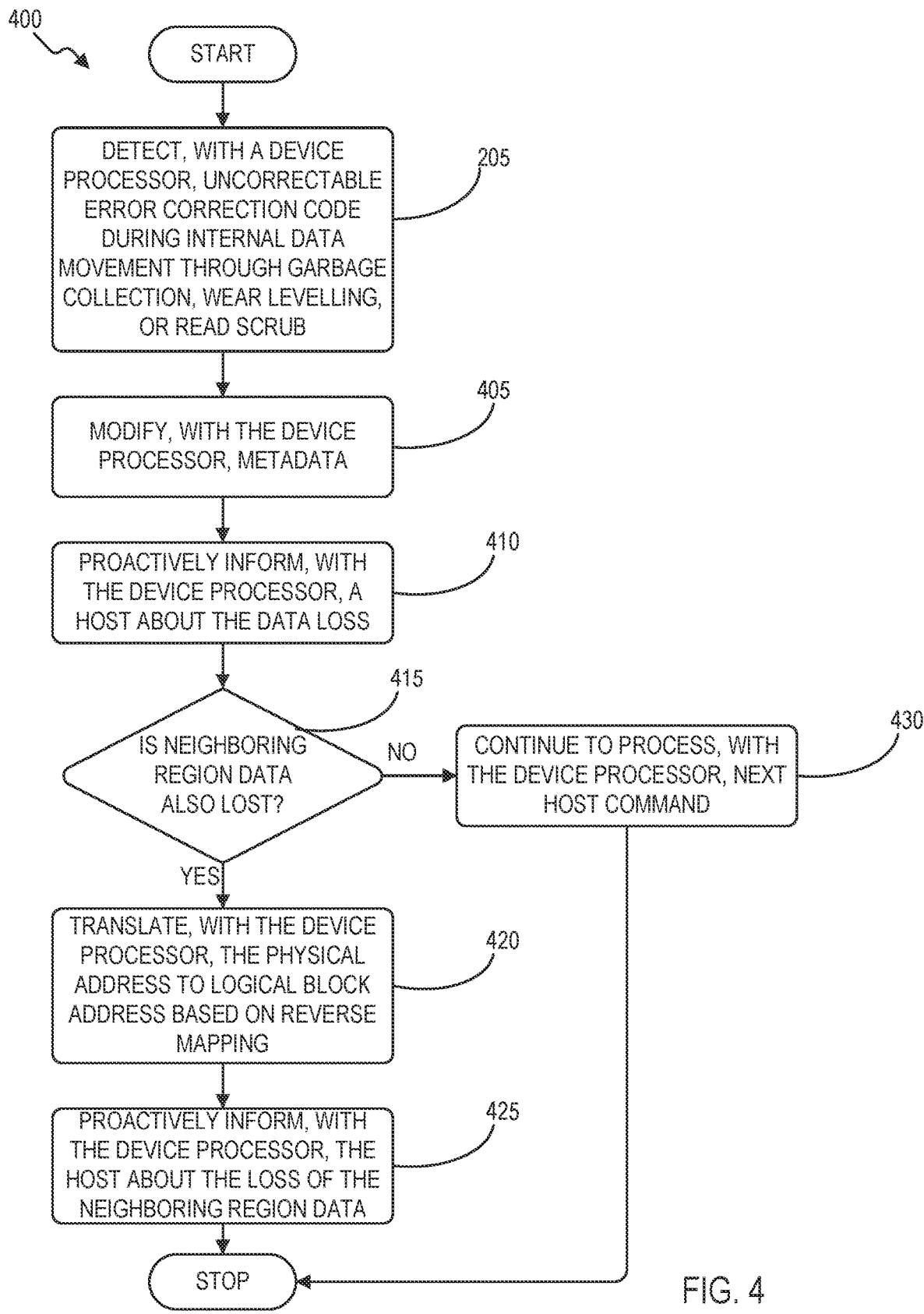
FIG. 4 is a flowchart illustrating a method of proactively handling data loss with a data storage device, according to some aspects of the present disclosure.

As stated above, the device memory 124 may store a set of instructions that, when executed by the device processor 122, perform a set of operations for loss notification and handling. FIG. 4 is a flowchart illustrating a method 400 of proactively handling data loss with a data storage device (such as the data storage device 102 of FIG. 1). The method 400, similar to the comparative method 200, includes block 205, described with respect to FIG. 2. However, unlike the method 200, the method 400 is configured to proactively notify a host device (such as the host device 108) in the event of data loss.

Specifically, the method 400 includes modifying, with the device processor, metadata corresponding to the lost LBA (at block 405). The modification of metadata may be similar to the modification described with respect to block 210. For example, the device processor 122 modifies metadata corresponding to the lost LBA.

The method 400 includes proactively informing, with the device processor, a host device about the data loss (at block 410). In some embodiments, informing the host device about the data loss includes generating a notification. For example, the device processor 122 proactively informs the host device 108 (or a user of the host device 108) about the data loss.

The method 400 includes determining whether data stored in regions neighboring (or adjacent to) the lost LBA are also lost (at decision block 415). In some instances, the neighboring regions physically neighbor the lost LBA. A property of NAND memory is that when some cells get disturbed, surrounding region cells (i.e., the neighboring regions) may be similarly disturbed, which may be determined by decision block 415. The neighboring regions (or physical addresses) may be in the same plane, a neighboring plane, or adjacent strings in the same or different wordlines. For example, the device processor 122 determines whether data stored in regions neighboring the lost LBA are also lost.

When neighboring data is lost (i.e., "YES" at decision block 415), the method 400 includes translating, with the device processor, the physical address of the lost data to the corresponding LBA based on reverse mapping (at block 420). The device processor may implement a reverse flash translation table stored within a memory of the data storage device to determine the LBAs for the neighboring physical addresses. In some embodiments, the reverse flash translation table may be a physical-to-logical (P2L) table. In other embodiments in which P2L tables are not used, the data storage device sanitizes the physical regions through actual data read to determine loss. For example, when neighboring data is lost, the device processor 122 translates the physical address(es) of the lost data to the corresponding LBA(s) based on reverse mapping, using a reverse flash translation table stored in device memory 124.

Upon translating the physical address(es) of the lost data to the corresponding LBA(s) based on reverse mapping, the method 400 includes proactively informing, with the device processor, the host device again of the data loss corresponding to the neighboring regions (at block 425). For example, the device processor 122 proactively informs the host device 108 (or a user of the host device 108) of the data loss corresponding to the neighboring regions.

Returning to decision block 415, when neighboring data is not lost (i.e., "NO" at decision block 415), the method 400 also includes continuing to process, with the device processor, the next host command (at block 430). For example, when neighboring data is not lost, the device processor 122 continues to process the next command received from the host device 108.

In some embodiments, the method 400 may also include receiving, from the host device, lost data associated with the logical block address corresponding to the uncorrectable error correction code and writing the lost data to the memory. In these embodiments, the lost data may be recovered by receiving a copy of the lost data from the host device 108 in response to informing the host device 108 about the data loss. In some instances, writing the lost data to the memory includes receiving, from the host device, a new write command to write the lost data received from the host device to the same LBA(s) corresponding to the lost data. In other instances, writing the lost data to the memory includes receiving, from the host device, a new write command to write the lost data received from the host device to the different LBA(s) than the LBA(s) corresponding to the lost data.

Figure 5:
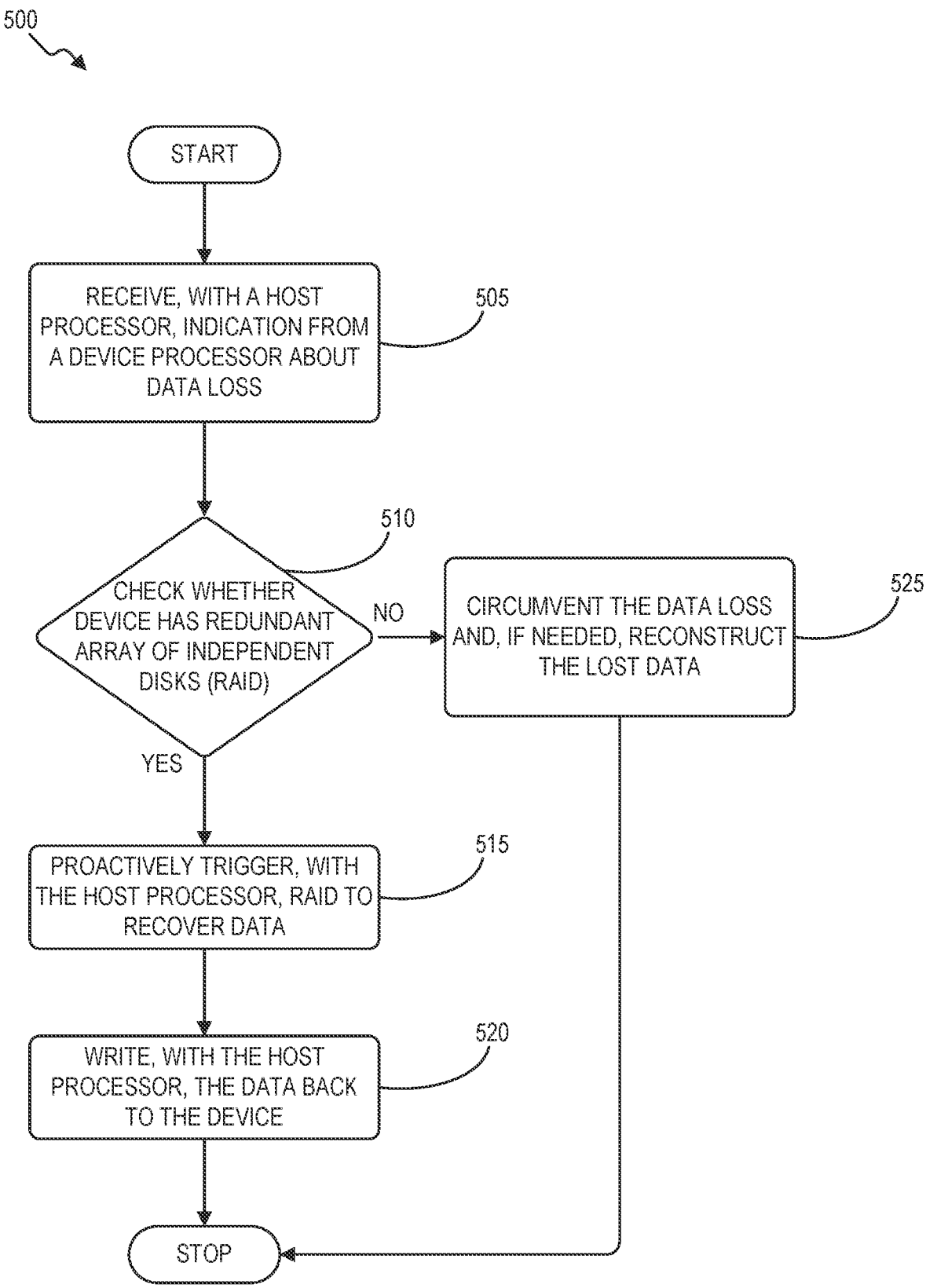
FIG. 5 is a flowchart illustrating a method of proactively handling data loss with a host device, according to some aspects of the present disclosure.

As stated above, the host memory 130 may store a set of instructions that, when executed by the host processor 128, perform a set of operations for loss handling. FIG. 5 is a flowchart illustrating a method 500 of proactively handling data loss with a host device (such as the host device 108). Unlike the comparative method 300 of FIG. 3, the method 500 is configured to proactively handle a loss of data.

The method 500 includes receiving, with a host processor, indication from a device processor about data loss (at block 505). The indication may be generated by the device processor in block 410. For example, the host processor 128 receives an indication from the device processor 122 about data loss.

The method 500 includes checking, with the host processor, whether the data storage device has a RAID mechanism (at decision block 510). RAID is a mechanism by which a data storage system stores data in multiple drives of the system. For example, the host processor 128 checks whether the data storage device 102 has a RAID mechanism.

When the data storage device has a RAID mechanism (i.e., "YES" at decision block 510), the method 500 includes proactively triggering, with the host processor, RAID to recover the lost data (at block 515). For example, when the data storage device 102 has a RAID mechanism, the host processor 128 proactively triggers RAID to recover the lost data.

The method includes writing, with the host processor, the data back to the data storage device (at block 520). For example, the host processor 128 writes the data (recovered from RAID) back to the data storage device 102.

Returning to decision block 510, when the data storage device does not have a RAID mechanism (i.e., "NO" at decision block 510), the method 500 also includes circumventing, with the host device, the UECC or, when needed, reconstructing the data that is lost (at block 525). Reconstructing the lost data may include a Weiner filter or an iterative blind deconvolution for image restoration, or estimation from neighboring frames by finding spatial and temporal correlations between the available frames for video restoration. For example, when the data storage device 102 does not have a RAID mechanism, the host processor 128 circumvents the UECC or, when needed, reconstructs the data that is lost.

The following are enumerated examples of devices, methods, and systems of the present disclosure. Example 1: A data storage device comprising: a non-volatile memory; and a controller comprising an electronic processor and a controller memory, the controller memory storing a set of instructions that, when executed by the electronic processor, instruct the controller to: detect, with the electronic processor, an uncorrectable error correction code (UECC) during an internal data movement process of the non-volatile memory, modify a metadata field associated with a logical block address (LBA) corresponding to the UECC, inform an external electronic device about the UECC, and determine whether data stored in at least one adjacent region to the LBA is lost.

Example 2: The data storage device of Example 1, wherein the internal data movement process is a garbage collection process, a wear levelling process, or a read scrub process.

Example 3: The data storage device of any of Example 1 or 2, wherein, when the electronic processor determines that the data stored in the at least one adjacent region is lost, the instructions further instruct the controller to: translate a physical address of the at least one adjacent region to a second LBA corresponding to the at least one adjacent region, and inform the external electronic device that the data stored in the at least one adjacent region is lost.

Example 4: The data storage device of Example 3, wherein translating the physical address to the second LBA is based on a reverse mapping operation.

Example 5: The data storage device of any of Examples 1 through 4, wherein, when the electronic processor determines that the data stored in the at least one adjacent region is not lost, the instructions further instruct the controller to process a command received from the external electronic device.

Example 6: The data storage device of any of Examples 1 through 5, wherein the memory is a NAND memory.

Example 7: The data storage device of any of Examples 1 through 6, wherein the instructions further instruct the controller to: receive, from the external electronic device, lost data associated with the LBA corresponding to the UECC; and write the lost data to the memory.

Example 8: The data storage device of Example 7, wherein writing the lost data to the memory includes receiving, from an external electronic device, a new write command to write the lost data to the LBA corresponding to the UECC.

Example 9: A method of handling data loss, the method comprising: detecting, with an electronic processor, an uncorrectable error correction code during an internal data movement process of a data storage device; modifying a metadata field associated with a logical block address corresponding to the UECC; informing an external electronic device about the UECC; and determining whether data stored in at least one adjacent region to the LBA is lost.

Example 10: The method of Example 9, wherein the internal data movement process is a garbage collection process, a wear levelling process, or a read scrub process.

Example 11: The method of Example 9 or 10, wherein, when the data stored in the at least one adjacent region is lost, the method further comprises: translating a physical address of the at least one adjacent region to a second LBA corresponding to the at least one adjacent region; and informing the external electronic device that the data stored in the at least one adjacent region is lost.

Example 12: The method of Example 11, wherein translating the physical address to the second LBA is based on a reverse mapping operation.

Example 13: The method of any of Examples 9 through 12, wherein, when the data stored in the at least one adjacent region is not lost, the method further comprises processing a command received from the external electronic device.

Example 14: A data storage system comprising: a data storage device including a memory controller and a memory, the memory controller including an electronic processor and a controller memory; and an external electronic device including an external electronic device processor and an external electronic device memory; wherein the controller memory stores a set of instructions that, when executed by the electronic processor, instruct the data storage device to: detect, with the electronic processor, an uncorrectable error correction code during an internal data movement process of the data storage device, modify a metadata field associated with a logical block address corresponding to the UECC, generate a notification to be sent to the external electronic device about the UECC, and determine whether data stored in at least one adjacent region to the LBA is lost.

Example 15: The data storage system of Example 14, wherein the internal data movement process is a garbage collection process, a wear levelling process, or a read scrub process.

Example 16: The data storage system of Example 14 or 15, wherein, when the electronic processor determines that the data stored in the at least one adjacent region is lost, the instructions further instruct the data storage device to: translate a physical address of the at least one adjacent region to a second LBA corresponding to the at least one adjacent region based on a reverse mapping operation, and inform the external electronic device that the data stored in the at least one adjacent region is lost.

Example 17: The data storage system of any of Examples 14 through 16, wherein, when the electronic processor determines that the data stored in the at least one adjacent region is not lost, the instructions further instruct the data storage device to process a command received from the external electronic device.

Example 18: The data storage system of any of Examples 14 through 17, wherein the external electronic device memory stores a set of instructions that, when executed by the external electronic device processor, instruct the external electronic device to: receive, with the external electronic device processor, the notification from the electronic processor about the UECC, and check, with the external electronic device processor, whether the data storage device includes a redundant array of independent disks (RAID) mechanism.

Example 19: The data storage system of Example 18, wherein, when the external electronic device processor determines that the data storage device includes the RAID mechanism, the instructions further instruct the external electronic device to: trigger, with the external electronic device processor, the RAID mechanism to recover the data stored in the LBA, and write, with the external electronic device processor, the data to the data storage device.

Example 20: The data storage system of Example 18, wherein, when the external electronic device processor determines that the data storage device does not include a RAID mechanism, the instructions further instruct the external electronic device to: circumvent the UECC, and reconstruct the data stored in the LBA.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Various features and advantages of the embodiments and aspects described herein are set forth in the following claims.

What is claimed is:

1. A data storage device comprising:
a non-volatile memory; and
a controller comprising an electronic processor and a controller memory, the controller memory storing a set of instructions that, when executed by the electronic processor, instruct the controller to:
detect, with the electronic processor, an uncorrectable error correction code (UECC) during an internal data movement process of the non-volatile memory,
modify a metadata field associated with a logical block address (LBA) corresponding to the UECC,
inform an external electronic device about the UECC, and
determine whether data stored in at least one adjacent region to the LBA is lost.

2. The data storage device of claim 1, wherein the internal data movement process is a garbage collection process, a wear levelling process, or a read scrub process.

3. The data storage device of claim 1, wherein, when the electronic processor determines that the data stored in the at least one adjacent region is lost, the instructions further instruct the controller to:
translate a physical address of the at least one adjacent region to a second LBA corresponding to the at least one adjacent region, and
inform the external electronic device that the data stored in the at least one adjacent region is lost.

4. The data storage device of claim 3, wherein translating the physical address to the second LBA is based on a reverse mapping operation.

5. The data storage device of claim 1, wherein, when the electronic processor determines that the data stored in the at least one adjacent region is not lost, the instructions further instruct the controller to process a command received from the external electronic device.

6. The data storage device of claim 1, wherein the non-volatile memory is a NAND memory.

7. The data storage device of claim 1, wherein the instructions further instruct the controller to:
receive, from the external electronic device, lost data associated with the LBA corresponding to the UECC; and
write the lost data to the non-volatile memory.

8. The data storage device of claim 7, wherein writing the lost data to the non-volatile memory includes receiving, from an external electronic device, a new write command to write the lost data to the LBA corresponding to the UECC.

9. A method of handling data loss, the method comprising:
detecting, with an electronic processor, an uncorrectable error correction code during an internal data movement process of a data storage device;
modifying a metadata field associated with a logical block address corresponding to the UECC;
informing an external electronic device about the UECC; and
determining whether data stored in at least one adjacent region to the LBA is lost.

10. The method of claim 9, wherein the internal data movement process is a garbage collection process, a wear levelling process, or a read scrub process.

11. The method of claim 9, wherein, when the data stored in the at least one adjacent region is lost, the method further comprises:
translating a physical address of the at least one adjacent region to a second LBA corresponding to the at least one adjacent region; and
informing the external electronic device that the data stored in the at least one adjacent region is lost.

12. The method of claim 11, wherein translating the physical address to the second LBA is based on a reverse mapping operation.

13. The method of claim 9, wherein, when the data stored in the at least one adjacent region is not lost, the method further comprises processing a command received from the external electronic device.

14. A data storage system comprising:
a data storage device including a memory controller and a memory, the memory controller including an electronic processor and a controller memory; and
an external electronic device including an external electronic device processor and an external electronic device memory;
wherein the controller memory stores a set of instructions that, when executed by the electronic processor, instruct the data storage device to:
detect, with the electronic processor, an uncorrectable error correction code during an internal data movement process of the data storage device,
modify a metadata field associated with a logical block address corresponding to the UECC,
generate a notification to be sent to the external electronic device about the UECC, and
determine whether data stored in at least one adjacent region to the LBA is lost.

15. The data storage system of claim 14, wherein the internal data movement process is a garbage collection process, a wear levelling process, or a read scrub process.

16. The data storage system of claim 14, wherein, when the electronic processor determines that the data stored in the at least one adjacent region is lost, the instructions further instruct the data storage device to:
translate a physical address of the at least one adjacent region to a second LBA corresponding to the at least one adjacent region based on a reverse mapping operation, and
inform the external electronic device that the data stored in the at least one adjacent region is lost.

17. The data storage system of claim 14, wherein, when the electronic processor determines that the data stored in the at least one adjacent region is not lost, the instructions further instruct the data storage device to process a command received from the external electronic device.

18. The data storage system of claim 14, wherein the external electronic device memory stores a set of instructions that, when executed by the external electronic device processor, instruct the external electronic device to:
receive, with the external electronic device processor, the notification from the electronic processor about the UECC, and
check, with the external electronic device processor, whether the data storage device includes a redundant array of independent disks (RAID) mechanism.

19. The data storage system of claim 18, wherein, when the external electronic device processor determines that the data storage device includes the RAID mechanism, the instructions further instruct the external electronic device to:
- trigger, with the external electronic device processor, the RAID mechanism to recover the data stored in the LBA, and
- write, with the external electronic device processor, the data to the data storage device.

20. The data storage system of claim 18, wherein, when the external electronic device processor determines that the data storage device does not include a RAID mechanism, the instructions further instruct the external electronic device to:
- circumvent the UECC, and
- reconstruct the data stored in the LBA.

\* \* \* \* \*